United States Patent [19]
Theeuwes et al.

[11] 3,845,770
[45] Nov. 5, 1974

[54] OSMATIC DISPENSING DEVICE FOR RELEASING BENEFICIAL AGENT

[75] Inventors: Felix Theeuwes, Los Altos, Calif.;
Takeru Higuchi, Lawrence, Kans.

[73] Assignee: Alza Corporation, Palo Alto, Calif.

[22] Filed: June 5, 1972

[21] Appl. No.: 259,469

[52] U.S. Cl.................. 128/260, 128/130, 222/389, 424/15, 424/37
[51] Int. Cl.......................................... A61m 31/00
[58] Field of Search .......... 128/260, 130, 272, 269, 128/127–129, 213; 99/77.1; 424/15, 37, 19–21; 222/386.5, 389; 206/.5

[56] References Cited
UNITED STATES PATENTS

| | | | |
|---|---|---|---|
| 1,023,499 | 4/1912 | Bell..................................... | 128/260 |
| 1,279,564 | 9/1918 | McClure............................. | 128/272 |
| 1,434,531 | 11/1922 | Cyrenius............................. | 128/272 |
| 2,846,057 | 8/1958 | Polin................................... | 206/.5 |
| 2,962,023 | 11/1960 | Chappaz et al..................... | 128/260 |
| 3,093,831 | 6/1963 | Jordan ........................... | 128/260 X |
| 3,146,169 | 8/1964 | Stephenson et al.................. | 424/15 |
| 3,416,530 | 12/1968 | Ness.................................... | 128/260 |
| 3,574,820 | 4/1971 | Johnson et al..................... | 424/37 X |
| 3,630,200 | 12/1971 | Higuchi.............................. | 128/260 |

*Primary Examiner*—Richard A. Gaudet
*Assistant Examiner*—J. C. McGowan
*Attorney, Agent, or Firm*—Paul L. Sabatine; Edward L. Mandell; William H. Benz

[57] ABSTRACT

A wall surrounding and forming a compartment for containing a useful composition of matter and having a passageway for dispensing the composition is disclosed. The wall is comprised in at least a part of a material permeable to an external fluid. The composition is soluble in the fluid and exhibits an osmotic pressure gradient against the fluid or the composition has limited solubility and is admixed with an osmotically effective compound soluble in the fluid that exhibits an osmotic pressure gradient against the fluid. In operation, composition is dispensed from the device by fluid permeating into the compartment producing a solution of the soluble composition or a solution of the osmotically effective compound containing the composition, which solution in either operation is released through the passageway to the exterior of the device at a rate controlled by the permeability of the wall and the osmotic pressure gradient across the wall of the device.

15 Claims, 8 Drawing Figures

OSMATIC DISPENSING DEVICE FOR RELEASING BENEFICIAL AGENT

FIELD OF THE INVENTION

This invention pertains to both a novel and useful device for dispensing a useful composition of matter. More particularly, the invention relates to a dispensing device for the controlled and continuous dispensing of a composition over a prolonged period of time to produce a beneficial effect. Specifically, the invention concerns an osmotic dispenser manufactured with a minimum number of components and suitable for administering an active agent at a controlled and continuous rate to achieve a predetermined useful effect in animals, humans and other environments.

BACKGROUND OF THE INVENTION

Dispensing systems for the delivery of compositions of matter are well known to the prior art. These systems generally deliver their composition by diffusion, for example, from an enclosed capsule or by diffusion from a multi-structured device having a wall formed of a known polymer permeable to the composition into a selected environment. However, there is a large category of compositions that cannot be delivered by the prior art delivery systems because of at least one feature inherent in these devices which adversely affects their rate of release from the system or substantially prevents the release of the composition from the system. For example, many compositions cannot be delivered from a diffusion controlled delivery system because their permeation rate through the rate controlling material comprising the system is too small to produce a useful effect, or in many instances the composition molecules are too big and will not diffuse through the rate controlling material forming the device. Also, there is an additional class of useful products that cannot be satisfactorily delivered by diffusion devices because of a particular chemical characteristic of the product. This additional class includes salts that because of their ionic character will not diffuse through most polymers and polymeric like materials and unstable polar compounds that cannot be formulated into a satisfactory composition suitable for storage and delivery from a prior art device. Prior art diffusion systems encompassed within the above discussion are typically represented by U.S. Pat. No. 3,279,996, and the like.

The prior art attempted to overcome the above mentioned adverse features by proposing devices seemingly capable of releasing a solution containing a product at a relatively constant rate. One such device is disclosed in "Austral. J. Exp. Biol.," Vol. 33, pages 415 to 420, 1955. This device consists of three compartments confined in a specifically constructed housing and a clamp to hold a semi-permeable membrane. The driving force of the device depends on the continual presence of a solution of an osmotically effective red dye solute that exhibits an osmotic pressure gradient against water. The red dye is contained in a partially collapsed rubber compartment and it is separated from a second compartment containing water by a semi-permeable membrane. The partially collapsed bag is housed in a glass ampoule, along with a product compartment defined by the space between the bag and one end of the glass ampoule. The distant end of the ampoule defines a water compartment. The ampoule also is provided with a drug release nipple, and in operation when the product compartment is charged with a solution of a product, water in the water compartment moves through the semi-permeable membrane into the dye solution increasing its volume in the compartment causing it to expand against the rubber providing the mechanical force necessary to eject the product solution through the nipple. It is immediately evident that this device has certain adverse features that tend to diminish its practical use. For example, the device is difficult to construct into compartments that are essentially free of leaks plus the fabrication demands of a movable material that necessitates a rigid outer housing. Another inherent disadvantage which prevented its wide acceptance by the medical community is the requirement that the product be in solution which exhibit a deleterious tendency to be released from the device by simple leaching, the use of a solution of the product which use does not permit high concentrations of the product to be embodied within the device, the demand for an osmotically effective solute other than the product, and that many products on prolonged storage in solution undergo chemical deterioration. The device is further of limited value because it must carry its own water which increases the size of the device and thusly limits its use to a few environments. Another prior art attempt to provide a product dispensing device is disclosed in U.S. Pat. No. 3,604,417. The device disclosed in this patent is similar to the earlier prior art devices, and its design requires a semi-permeable membrane, a separate osmotically effective solute, a solution of the product and additionally the presence of a movable piston. The movable piston severly restricts the shape of the device, and this device, as with the above mentioned device, has not enjoyed wide acceptance because of construction problems and the inherent features that limit the use of the device.

In copending patent applications U.S. Ser. No. 106,131 filed on Jan. 13, 1971 and U.S. Ser. No. 106,161, filed on Jan. 13, 1971, with both applications assigned to the same assignee of the application, there is disclosed novel and useful osmotic dispenser devices that represent an improvement to the art. While these devices have made a valuable contribution to the art, they are designed with moving parts that tend to complicate their manufacture and they require, in addition to the product, the constant presence of an osmotically effective solute that exhibits an osmotic pressure gradient against water. This latter feature generally increases the size of the device and concommitantly restricts its use to fewer environments.

OBJECTS OF THE INVENTION

Accordingly, it is an immediate object of this invention to provide a novel dispensing device for the dispensing of a composition of matter to produce a beneficial effect, which device overcomes the aforesaid disadvantages associated with the prior art devices.

Still another object of the invention is to provide a novel dispensing device for dispensing a composition of matter at a controlled rate for a prolonged period of time.

Yet still another object of this invention is to provide a novel and useful dispensing device that is simple in construction, designed with a minimum number of parts, easy to use, and in operation exhibits all the practical and useful benefits obtained by the controlled, continuous, long-term administration of various compositions of matter, that is, active agents to animals, avians, humans and into other receptive environments.

A further object of this invention is to provide a novel dispensing device that can administer a complete pharmaceutical dosage regimen for a particular time period, the use of which requires intervention only for initiation and termination of the regimen.

Another object of this invention is to provide an improved dispensing device which will permit high concentration of an active agent to be contained therein, and which high concentrations of the agent will not exhibit the tendency to be leached from the device nor have its potency decreased by chemical breakdowns.

Yet still a further object of the invention is to provide a novel product dispensing device that contains a product which product can be used as an osmotically effective solute to exhibit an osmotic pressure gradient against an external fluid.

Yet a further object of the invention is to provide a product dispensing device that contains a product in a form suitable for storage thereby giving the device an improved shelf life.

Yet another immediate object of this invention is to provide a dispensing device for the administration of locally acting or systematically acting drugs to produce a physiologic or pharmacologic effect and which device can release the drug at a rate that does not vary with time.

Still yet another object of the invention is to provide a device containing drugs in various physicochemical forms such as esters, salts and the like that can be heat sterilized by conventional techniques.

Yet another important object of the invention is to provide a device for dispensing an active agent which device can have a variety of release rates ranging from very low to very high by using polymeric wall forming materials in combination with the active agent or a mixture of an active agent and another osmotically effective compound.

Yet still another object of the invention is to provide a novel and useful erodible or biodegradable device that erodes or degrades after the device has released the active agent.

Other objects, features, and advantages of the invention will be apparent to those skilled in the art from the detailed description of this specification, taken in conjunction with the drawings and the accompanying claims.

SUMMARY OF THE INVENTION

The invention concerns a device comprised of a wall surrounding a compartment as a means for containing a useful composition of matter such as a drug, a beneficial product or the like, and having a passageway communicating with the compartment and the exterior of the device for releasing the composition from the compartment. The wall of the device is comprised in at least a part of a material permeable to an external fluid common to the environment of use. Composition is dispensed from the device by the external fluid diffusing through the wall into the compartment to dissolve the composition or to dissolve an osmotically effective compound admixed with a composition having limited solubility, producing thereby an essentially saturated solution of the composition or an essentially saturated solution of the osmotic compound containing the latter composition, which solution in either instance is dispensed from the device by a constant influx of fluid from the environment and wherein the influx is generated by the continuous dissolution of the composition or the osmotically effective compound in the fluid diffusing at a controlled rate through the wall under the osmotic pressure gradient across the wall into the compartment. The device can in operation dispense a composition at a zero order rate of release for a prolonged period of time by maintaining the rate of dissolution of the composition, or the osmotic compound in the fluid constant. In the device, the latter is accomplished when the dissolution rate is larger than the rate of release of the composition or the osmotic compound in the fluid present in the passageway to the exterior of the device.

BRIEF DESCRIPTION OF THE DRAWINGS

In the drawings, which are not drawn to scale, but rather are set forth to illustrate various embodiments of the invention, the drawings are as follows.

In the drawings and specification, like parts in related figures are identified by like numbers. The terms appearing earlier in the specification and in the description of the drawings, as well as embodiments thereof, are further described elsewhere in the disclosure.

DETAILED DESCRIPTION OF THE DRAWINGS

Figure 1:
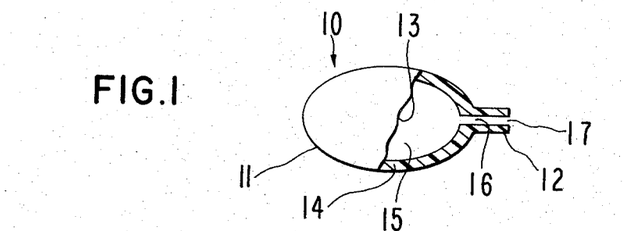
FIG. 1 is an illustration of a delivery device of the invention with a portion of the wall removed to illustrate the general structure of the device.

Turning now to the drawings in detail, which are examples of various delivery devices of the invention, and which examples are not to be construed as limiting, one embodiment of a novel osmotic delivery device is indicated in FIG. 1 by the number 10. Delivery device 10 is comprised of a body portion 11 and a neck 12 suitably joined to body 11. Device 10 is shown in open section 13 and device 10 is comprised of a wall 14 surrounding a compartment 15. Compartment 15 is a means for containing a composition, that is, it is a product compartment, and it can contain a product, or a mixture of products such as a drug or other active agent, not shown in FIG. 1. Neck 12 of device 10 in this embodiment is extended from body 11 and it is formed with a passageway 16 that communicates with chamber 15 and the exterior of the device through opening 17 at the end of neck 12. Neck 12 can be optionally integrally formed with body 11, or it can be separately manufactured and then joined to body 11 by conventional techniques such as adhesive sealing, heat joining, laser sealing, and the like.

Wall 14 of delivery device 10 is comprised in total or in at least a part of a semi-permeable membrane that possesses permeability to an external fluid while simultaneously being essentially impermeable to a product housed in compartment 15. That is, body 11 formed of wall 14 can be of unit construction, or composite construction with a section of a semi-permeable membrane either formed integral in wall 14, or optionally lined or laminated to wall 14. Wall 14 can be formed of a semi-permeable material that has uniform properties across all its dimensions, that is, it is substantially imperforate or substantially homogenous, or wall 14 can be formed of a material that is microporous, that is, a material having micropores or microholes, or it can be a semi-permeable material possessing both of these properties while remaining essentially impermeable to a product present in compartment 15. In operation in one aspect of the invention, when wall 14 is comprised of a material that is substantially imperforate, molecules of the external fluid dissolve in and diffuse through wall 14 by the process of diffusion into compartment 15. When wall 14 is made from a microporous material, molecules of external fluid migrate and diffuse into the micropores, as by diffusion, then into chamber 15. When wall 14 is made from semi-permeable material having both of these properties, external fluid enters the chamber by a concurrent operation of each of these mechanisms, that is, by diffusion through wall 14 and by diffusion through the pores of wall 14. Wall 14 is formed of synthetic or naturally occurring semipermeable materials and a detailed description of these materials appears later in this specification.

Figure 2:
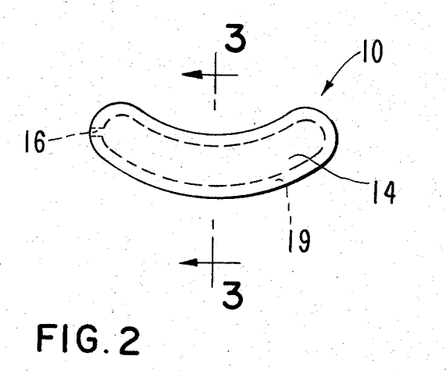
FIG. 2 is a perspective, top view of a dispensing device of the invention illustrating as one embodiment of the invention a device manufactured as an ocular drug delivery device.

In FIG. 2 there is seen another delivery device 10 manufactured according to the and manner of the invention. Product and device 10 in this embodiment is an ocular drug delivery device, of bean shape, and it is illustrated in FIG. 2 in top perspective view. Ocular drug delivery device 10 comprised of a wall 14 formed of a material that is permeable to an external fluid but substantially impermeable to a drug, not seen in FIG. 2 that is housed in device 10. Wall 14 carries on its inner surface an inner positioned wall 19 formed with a passageway 16, schematically illustrated by dashed lines, which wall 19 is extended around the perimeter of wall 14 to engage it in sealed relation with another wall, not shown in FIG. 2 and positioned distant from wall 14. The distant wall can be of the same construction as wall 14 or it can be formed of a material that is optionally permeable to an external fluid and impermeable to a drug to form a composite ocular drug delivery device.

Figure 3:
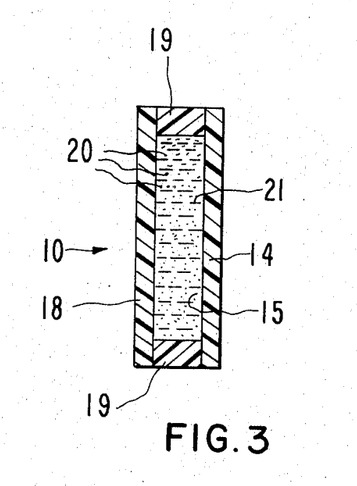
FIG. 3 is an enlarged cross-sectional view of the ocular drug delivery device of FIG. 2 through 3—3 depicting two walls with their interior peripheral surfaces in intimate contact with the surfaces of a wall positioned between the two walls.

Referring to FIG. 3, ocular drug delivery device 10 is seen in cross-section through 3—3 of FIG. 2. Ocular drug delivery device 10 of FIG. 3 is comprised of a first wall 14 and a third wall 18 distant from first wall 14. Wall 14 and wall 18 bear on their inner surface a second wall 19 that extends around the outer perimeter of wall 14 and wall 18 to form a closed drug compartment 15. Drug compartment 15 is comprised of a composition that is drug 20 or a mixture of drugs or the like. A passageway, not seen in FIG. 3, communicates with drug chamber 15 and the exterior of the device 10 for the release of drug 20. Wall 14 and wall 18 can be the same or they can be different and at least one of the walls, 14 or 18, or both of the walls, is comprised of a semi-permeable material permeable to the passage of external fluid 21, for example, tear fluid in the eye as by diffusion, or at least one of the walls, 14 or 18, is comprised of a microporous material into which tear fluid can permeate to subsequently enter chamber 15, as by diffusion. While at least one of wall 14 or wall 18 is permeable to tear fluid 21, both of the walls are essentially impermeable to the passage of drug 20. Wall 19 of device 10 is formed of a non-allergenic, biologically inert, insoluble in tear fluid material suitable for joining wall 14 and wall 18 together to form an essentially closed compartment 15 as defined by the inner surfaces of walls 14, 18 and 19. Device 10 when made from a material that is insoluble in tear fluid is removed from the eye after it completes its drug release program and discarded, or, device 10 can be made from a bioerodible material that bioerodes in situ to harmless end products after the device has completed its predetermined drug release program. The walls, 14, 18 and 19 of device 10 of the invention are formed of a material that can be rigid, semi-rigid, semi-flexible, flexible or the like, and for the users comfort in contact with skin, in body cavities, or in the eye it is preferably a flexible material.

Figure 4:
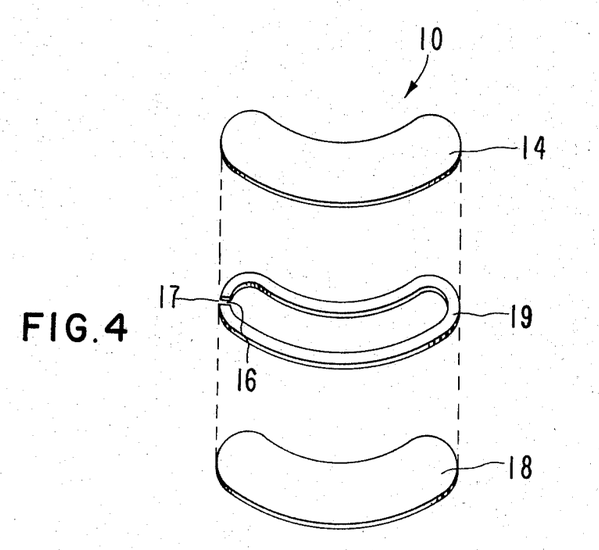
FIG. 4 is an exploded view illustrating three walls prior to their union wherein they act in concert to form a novel ocular drug delivery device.

In FIG. 4 there is illustrated the ocular drug delivery device 10 of FIGS. 2 and 3 in expanded view just prior to the joining of the parts into a composite article of manufacture. In device 10, the parts act in concert as an ocular drug delivery device to effectively meter a drug to the eye and to its surrounding tissues at a controlled and continuous rate for a prolonged period of time for the management of health and disease. Ocular drug delivery device 10 is comprised of a wall 14, a distant wall 18 and an inner wall for sealingly joining the inner perimeter of wall 14 to wall 19 and wall 18 to wall 14 into sealed relation to form a drug compartment defined by the inner surface of the walls for containing a drug not shown in FIG. 4. Wall 19 has a passageway 16 that extends through wall 19 and ends at orifice 17 to permit the passage of a drug from the compartment to the exterior of the device. Ocular drug device 10 can also have passageway 16 through wall 14 or wall 18 in lieu of the passageway through wall 19. Also, the device can be constructed with one or more passageways that are the functional equivalent in an operative embodiment of a single passageway. Passageway 16 can be of any geometric shape, for example, round, triangular, square, elliptical, and the like. Drug 20 as originally contained in device 10 is in solid form, usually a tablet, film, in films mixed with a binder, granules, powdered, a solid suspension, particles in liquid, liquid emulsions, containing solids, solids in solids and the like, and it can be geometric pieces of different shapes such as square, oval, round, rectangular and the like. Drug 20 is soluble in tear fluid, which is substantially an aqueous medium, that is water, and product 20 exhibits an osmotic pressure gradient against external tear fluid 21. The osmotic pressure gradient generally is dependent on the solubility of the product or solute in the fluid and the concentration difference across the wall. This osmotic pressure gradient between drug in the compartment and the external fluid will cause water to permeate through the wall into the compartment producing a dissolution and solution of the drug along with an accompanying hydrostatic pressure. In operation, drug 20 is released through passageway 16 by external fluid permeating through semi-permeable walls 14 or 18 or both into compartment 15 producing a solution of the drug which is released from the device at a rate corresponding to the rate controlled by the permeability of the semi-permeable membrane to the fluid and the osmotic pressure gradient between the drug in the compartment and the exterior fluid which combine to force drug from the device.

Figure 5:
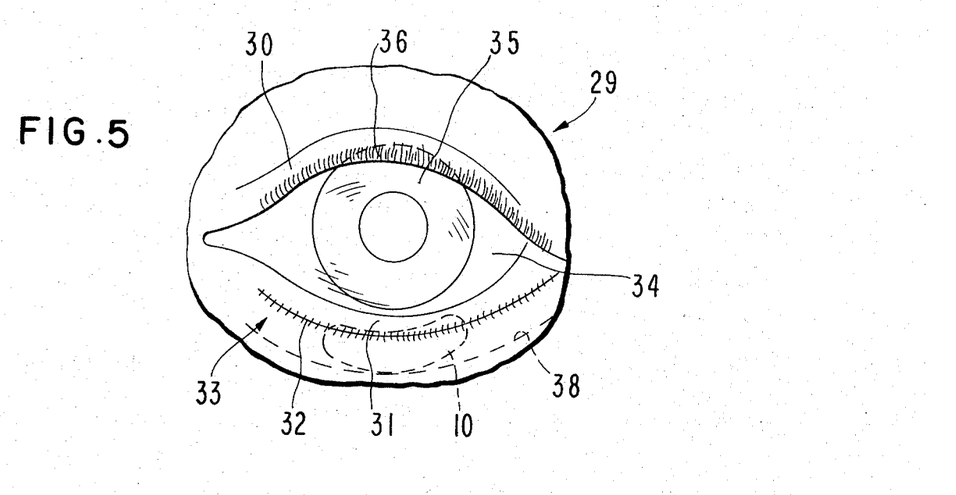
FIG. 5 is a partly diagrammatic, front view of a human eye illustrating an ocular drug delivery device of this invention in an operative position after its insertion into the eye.

Referring to FIG. 5 there is diagrammatically illustrated an ocular drug delivery device 10 positioned in immediate contact with an eyeball 29 for administering a drug to eye 29 at a metered dosage rate. In FIG. 5, eye 29 is comprised of an upper eyelid 30 with eyelashes 36 at the edge of eyelid 30 and a lower eyelid 31 with eyelashes 32 at the edge of eyelid 31. Eye 29 anatomically is comprised of an eyeball 33 covered for the greater part of its posterior area by a sclera 34 and at its central area by a cornea 35. Eyelids 30 and 31 are lined with an epithelial membrane or palpebral conjunctiva, not shown, and sclera 34 is lined with a bulbar conjunctiva which covers the exposed surface of eyeball 33. Cornea 35 is covered with a transparent epithelial membrane, not shown in this figure. The portion of the palpebral conjunctiva which lines upper eyelid 30 and the underlying portion of the bulbur conjunctiva defines an upper cul-de-sac, not shown in FIG. 5, while that portion of the palpebral conjunctiva which lines lower eyelid 31 and the underlying portion of the bulbar conjunctiva defines a lower cul-de-sac, also not seen in FIG. 5. The novel osmotic drug delivery device 10 of this invention is designed for insertion in the cul-de-sac of the conjunctiva between sclera 34 of eyeball 33 and upper eyelid 30, or device 10 as seen in broken continuous lines is adapted for positioning in the cul-de-sac of the conjunctiva between the sclera 34 of eyeball 33 and lower eyelid 31, generally to be held in drug administration position by the natural pressure of the respective eyelid.

Figure 6:
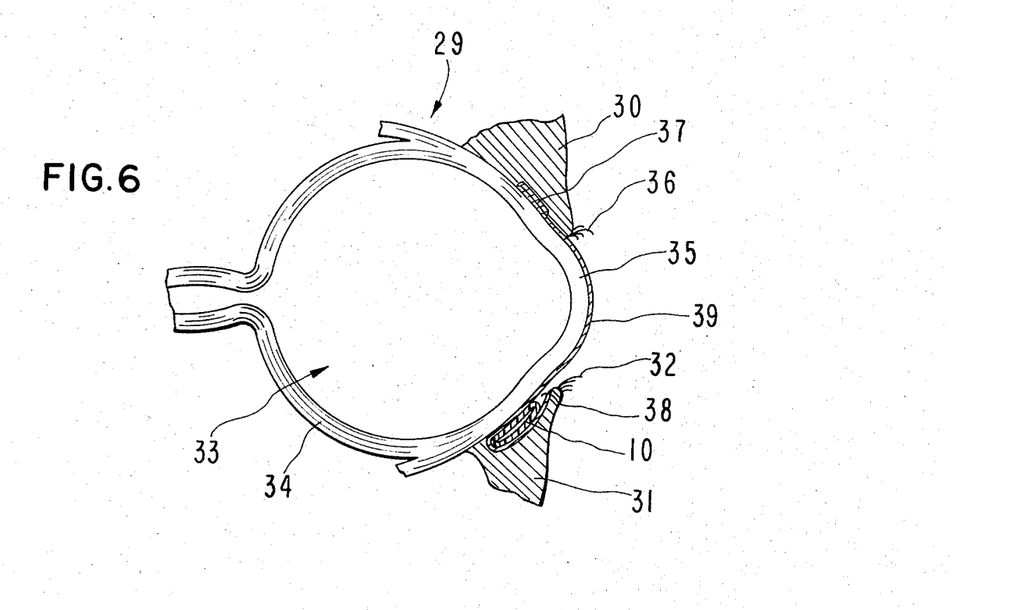
FIG. 6 is a view partly in vertical section and partly diagrammatic of an eyeball and the upper and lower eyelids associated therewith showing the novel ocular product dispensing device of this invention in product administration operative position.

Turning to FIG. 6, which is considered in cooperation with FIG. 5, there is seen a horizontal section through a human eye 29 illustrating an osmotic ocular drug delivery device 10 in drug administration position. Eye 29 is generically comprised of upper eyelid 30 and lower eyelid 31 with their respective eyelashes 36 and 32. Eye 29 is further comprised of eyeball 33, cornea 35 and sclera 34. An upper cul-de-sac 37 and a lower cul-de-sac 38 are defined by a conjunctiva 39. Ocular drug delivery device 10 is positioned in lower cul-de-sac 38 to continuously dispense a metered amount of a drug or a combination of drugs from the device to the eye and its surrounding tissues over a prolonged period of time. In medical operation, after drug leaves the ocular drug delivery device, it is transported to the eye and its surrounding tissues by physiological processes such as the flow of tear liquid, blinking action of the eyelids, and the like.

Figure 7:
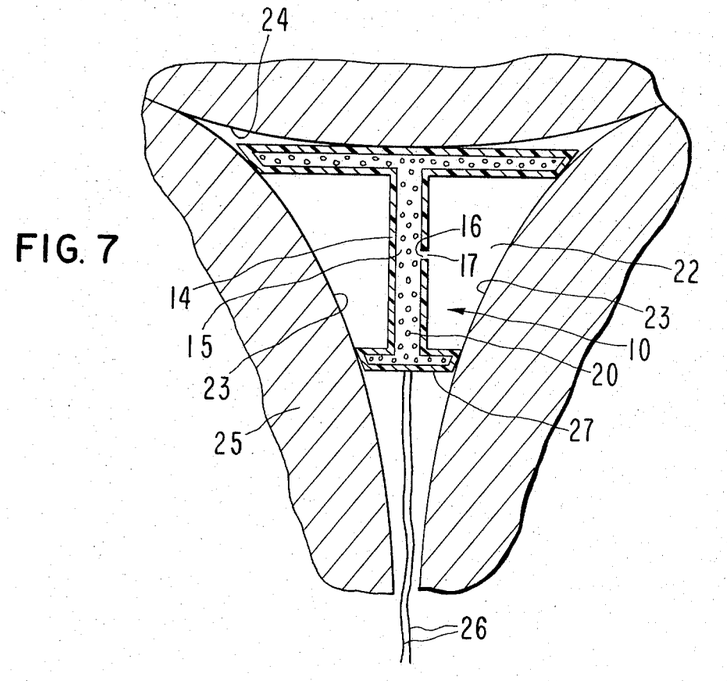
FIG. 7 is a frontal, fragmentary view of a uterine cavity showing a product releasing intrauterine device manufactured in accordance with the invention and positioned in a uterine cavity; and, FIG. 8 is still another embodiment of the invention illustrating a side, fragmentary view of an anal osmotic drug delivery device for releasing a drug in a body cavity.

In FIG. 7 there is graphically depicted another product dispensing device 10 fashioned as an intrauterine contraceptive antifertility delivery device prepared according to the spirit of the invention. Device 10, in this embodiment, is of letter "H" configuration and it is adapted to be located within a uterine cavity and it contacts the sides 23 as well as the fundus uteri 24 of uterus 25. A thread 26 is attached to the trailing end 27 of device 10 for manually removing it from uterus 25. Device 10 is comprised of a wall formed of a semipermeable membrane surrounding a product compartment 15. A passageway 16 serves as a conduit for the movement of drug 20 from compartment 15 into uterus 23. Compartment 15 is comprised of an antifertility agent 20 that may be soluble in uterine fluid and exhibits an osmotic pressure gradient against the fluid, or agent 20 can have limited solubility such as slightly soluble or moderately soluble in uterine fluid and have mixed therewith either homogenously or heterogenously, an osmotically effective solute that is soluble in uterine fluid and exhibits an osmotic pressure gradient against external uterine fluid. Wall 14 is formed of a semipermeable material that lets uterine fluid permeate into chamber 15 at a rate controlled by the permeability of the material. In operation, intra-uterine device 10 in one embodiment is comprised of semipermeable walls and having its compartment charged with a mixture comprised of the antifertility agent progesterone that has limited solubility in an aqueous medium and an aqueous soluble, osmotically effective solute that exhibits an osmotic pressure gradient against the aqueous medium, that is uterine fluid, which device 10 is positioned in a uterine cavity for releasing the antifertility agent at a zero order rate of release to the uterine cavity throughout the major portion of the device's medical history. An insoluble antifertility drug 20 also can be used in a form that is soluble in uterine fluid but physiologically inactive until its release from the device to the uterine cavity wherein it is converted by the uterus and its surrounding tissues to a physiologically active compound. When a soluble form of an antifertility drug is used, it serves as the osmotic solute eliminating the need for an additional solute. Antifertility drug is released through passageway 16 in the fluid that permeates through the wall producing the osmotic solute containing, in the case of a drug of limited solubility, undissolved and some dissolved antifertility agent which is released at a rate that corresponds to the rate controlled by the permeability of the membrane to the fluid and the osmotic attraction to the fluid as expressed by the osmotic pressure gradient across the wall.

Figure 8:
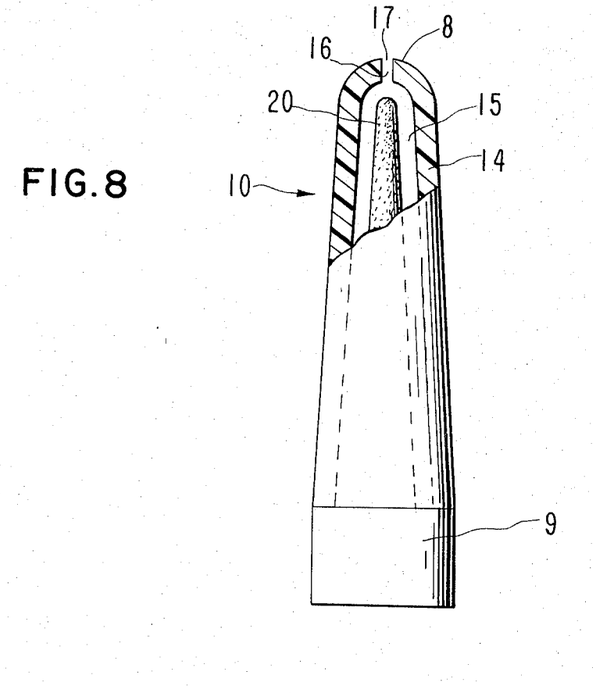

FIG. 8 illustrates another product delivery device 10 of the invention. In FIG. 8, delivery device 10 is designed for administering a drug 20 within a body opening, the anal canal, not shown. Product delivery device 10 is comprised of a semipermeable wall 14 shaped like an obelisk with a lead end 8 and a tailing end 9. Wall 14 surrounds a product compartment 15 which serves as a reservoir for drug 20. Reservoir 16 is comprised of drug 20 in solid form that can be released from device 10 at a metered rate over a prolonged period of time. Wall 14 is suitably formed with a passageway terminating in an outlet 17 for releasing drug from device 10. Wall 14 can be isotropic, wherein the structure is homogenous throughout the cross-section of the wall, or wall 14 can be anisotropic wherein the structure is non-homogenous. In this device, as with the devices discussed above, drug is released by the operation of the device as fully described in the earlier devices.

While the above FIGS. 1 through 8 inclusive are illustrative of various product delivery devices that can be made according to the invention, it is to be understood that these delivery devices are not to be construed as limiting, as the delivery devices of the invention can take a wide variety of shapes, sizes and forms for administering, for example, the drug at controlled rates to different areas of the body or to different drug receptor sites, or for administering other active agents to other environments. For example, the invention includes pessaries, prosthesis, artificial glands, cervical rings, intrauterine drug delivery devices of cylindrical, bullet, elliptical, circular, bulbous, loops, bows, or any other geometrical shape that readily lends itself to intrauterine placement such as Birnberg's Bow in U.S. Pat. No. 3,319,625; Comet in U.S. Pat. 3,256,878; Majzlin Spring in U.S. Pat. 3,397,691; Inhiband in U.S. Pat. 3,323,520; Bakunin in U.S. Pat. 3,405,711; Shamrock in U.S. Pat. 3,077,879; the ring with tail; Ota ring, and the like. The devices also include osmotic ocular drug delivery devices of any convenient geometric shape for comfortable retention in the cul-de-sac of the eye such as ellipsoid, bean-shaped, banana-shaped, circular shaped, rectangular shaped, trapezoidal, doughnut shaped, and the like. In cross-section, it can be doubly convex, concavo-convex, rectangular, and the like, as the osmotic ocular device in operation will tend to conform to the configuration of the eye. The general dimensions of the osmotic ocular device can vary with the size of the device and conforming to the amount of drug in the device's drug compartment, the rate at which the drug is to be administered to the eye and by the size of the eye. Satisfactory devices for insertion in the cul-de-sac of the eye generally have a length of 4 to 20 millimeters, a width of 1 to 15 millimeters, and a thickness of 0.1 to 4 millimeters, a reservoir with a diameter of 1.2 to 14.8 millimeters, and contain from 1 microgram to 100 milligrams of drug or more, and the like. The ocular drug delivery device can be made of a material that is biologically inert, non-allergenic and essentially insoluble in tear fluids, or it can be made from a bioerodible, non-allergenic material. Additionally, the dispensing device can be used for the release of a wide variety of agents such as growth regulating substances, pesticides, algicides, parasiticides, rodenticides, insecticides, fungicides, sex sterilants, fertility promoters, and the like. Also, all of the dispensing devices are of appropriate known shapes and sizes for implantation, insertion or positioning in the desired body cavities or in the desired environment, such as streams, aquariums, laboratory facilities, and the like.

DETAILED DESCRIPTION OF THE DISCLOSURE

In accordance with the practice of the present invention, it has now been found that the delivery device of the invention provides many important advantages over previously known osmotically operated delivery devices. One advantage of the device is the ease of construction of the drug delivery device by standard manufacturing techniques into devices of various shapes, and forms for delivering products to a recipient or environment. A more important advantage of the claimed delivery device is that it can be manufactured comprised of a minimum number of parts, that is, a wall and a composition of matter.

The wall forming the device of the invention is a material that is semi-permeable, for example a material that is permeable to an external fluid such as water and the like while essentially impermeable to a selected product or to other compounds in the device. The material forming the wall can be non-erodible or bioerodible after a predetermined period of time and in each instance it is semi-permeable to solvent but not to solute and is suitable for construction of the osmotic powered device. Typical materials for forming the wall include membranes known to the art as osmosis and reverse osmosis membranes such as commercially available unplasticized cellulose acetate, plasticized cellulose acetate, reinforced cellulose acetate, cellulose nitrate with 11 percent nitrogen, cellulose diacetate, cellulose triacetate, agar acetate, amylose triacetate, beta glucan acetate, beta glucan triacetate, cellulose acetate, acetaldehyde dimethyl acetate, cellulose acetate ethyl carbamate, cellulose acetate phthalate, cellulose acetate methyl carbamate, cellulose acetate succinate, cellulose acetate dimethaminoacetate, cellulose acetate ethyl carbonate, cellulose acetate chloroacetate, cellulose acetate ethyl oxalate, cellulose acetate methyl sulfonate, cellulose acetate butyl sulfonate, cellulose acetate propionate, cellulose acetate p-toluene sulfonate, triacetate of locust gum bean, cellulose acetate with acetylated hydroxyethyl cellulose, hydroxylated ethylene-vinylacetate, cellulose acetate butyrate having a viscosity of from about 10 seconds to about 50 seconds, cellulose acetate butyrate containing about 17 percent of combined butyryl and about 29.5 percent acetyl, permselective, aromatic nitrogen-containing polymeric membranes that exhibit water permeability and essentially no solute passage, osmosis membranes made from polymeric epoxides, osmosis membranes made from copolymers of an alkylene oxide and alkyl glycidyl ether, semi-permeable polyurethanes, semi-permeable polyglycolic or polylactic acid and derivatives thereof, thin film membranes are disclosed by Loeb and Sourirajan in U.S. Pat. No. 3,133,132, the membranes of ionically associated polyelectrolytes, the polymers formed by the coprecipitation of polycation and a polyanion as described in U.S. Pat. Nos. 3,276,586; 3,541,005; 3,541,006; 3,546,142; 3,173,876; derivatives of polystyrene such as poly(sodium styrenesulfonate) and poly(vinylbenzyltrimethyl-ammonium chloride), and the like. Generally, membranes having a fluid permeability of 0.01 to 10 cc/cm$^2$/hour or day/or higher at atmosphere pressure against a saturated product solution or saturated solute solution to a changing concentration at the temperature of use while simultaneously possessing a high degree of impermeability to the product or solute are useful and within the spirit of the invention.

Representative of compositions of matter that can be released from the device and can function as a solute are without limitation those compositions soluble in aqueous type fluids such as tear fluid, tissue juices, water; organic solvents and the like. The expression "composition of matter" as used in this disclosure is meant to include the terms product, active agent, beneficial agent and the like, and these terms are deemed as functionally equivalent for the present invention. The composition can be a drug, nutrient, plant growth regulator, biocide, insecticide, pesticide, germicide, attractants, and the like. These compositions are osmotically effective as solutes since they can generate a solvent concentration gradient between the exterior medium and the medium inside the device. These compositions include organic and inorganic compounds such as ephedrine hydrochloride, ephedrine sulfate, hydroxyamphetamine, isoproternol hydrochloride, carbachol, pilocarpine hydrochloride, pilocarpine nitrate, demecarium bromide, echothrophate iodide, physostigmine salicylate, propranolol hydrochloride, homatropine hydrochloride, homatropine methylbromide, methscopolamine nitrate, alverine citrate, chlorphenoxamine, hydrochloride, calcium pantothenate and the like. Additional compositions that can be administered are those that produce a physiologically or pharmacalogically useful effect at a point in near relation to the delivery device, or compositions that will produce a physiological or pharmacological response at a site remote from the point of release from the device include drugs generically known as, without limitation, hypnotics, sedatives, psychic energizers, tranquilizers, anticonvulsants, muscle relaxants, analgesics, anti-inflammatory, anesthetics, anti-spasmodics, anti-ulcer agents, anti-microbials, hormonal agents, cardiovascular agents, diuretics, neoplastic agents, and the like.

The composition, drug or the like can also be in various forms, such as uncharged molecules, components of molecular complexes, pharmacologically acceptable salts such as hydrochloride, hydrobromide, sulfate, phosphate, nitrate, borate, acetate, maleate, tartrate, salicylate and the like. For acidic drugs, salts of metals, amines, or organic cations, for example quaternary ammonium can be employed. Furthermore, simple derivatives of the drug such as esters, ethers, amides and the like which have solubility characteristics are suitable for the purpose of the invention. Also, a product or drug that is water insoluble can be used in a form that is a water soluble derivative thereof to effectively serve as a solute, and on its release from the device it is converted by enzymes, hydrolyzed by body pH, or other metabolic processes to the original form or to a biologically active form. Additionally, the drug formulation can have various art known forms such as solution, dispersion, paste, cream, particle, granule, tablet, emulsions, suspensions, powders and the like.

Various osmotically effective solutes including organic and inorganic compounds are advantageously used when it is desired to release a composition, product, drug or the like having limited solubility from the device. The term "limited solubility" as used herein means that the compound has a solubility of about less than 1% by weight in the external fluid, that is, the ratio of the weight of the compound in solution to the weight of the water of that solution is less than 1 percent. The term includes low, slightly and moderate solubility of the composition in the field. The osmotically effective compounds or solutes confined in the device are a substantial motive force of the device and they exhibit an osmotic pressure gradient against an external fluid across the membrane while the membrane is substantially impermeable to the passage of the osmotically effective solute to prevent loss thereof through the membrane. The solutes are conveniently used by dispensing or homogenously or heterogenously mixing a solute or a mixture of solutes with the composition, active agent, product or the like either before they are charged into the compartment or by self mixing after charging a solute and composition into the compartment. In operation, these solutes osmotically attract fluid into the device to produce a solution of the solute which is released from the device concomitantly transporting therewith undissolved and dissolved composition, product, drug or the like. Various osmotically effective solutes include compounds such as magnesium sulfate, magnesium chloride, sodium chloride, lithium chloride, potassium sulfate, sodium carbonate, sodium sulfite, lithium sulfate, calcium bicarbonate, sodium sulfate, calcium sulfate, potassium acid phosphate, calcium lactate, magnesium succinate, tartaric acid, soluble carbohydrates such as raffinose, glucose, mixtures thereof and the like. The solid solute, present initially in excess, can be in any suitable physical form such as particles, crystals, pellets, tablets, strips, film, granules and the like.

Additionally, the composition and composition solute can be used in a mixed form by mixing the composition or product with a binder. The product in powdered, granular, piece and the like form, is homogenously or heterogenously dispersed in the binder which binder is water soluble or water insoluble but will release the product on contact with water. Typical water soluble binders include polyethylene glycol, gelatin, agar, carboxycellulose, ethylmethylcellulose, polyvinyl alcohol, polyvinylpyrrolidone, water soluble starch derivatives and the like. Typical water insoluble binders that can comprise about 1 to 50 percent of the composition include cellulose acetate, polyurethane, epoxides, and other insoluble binders that permit the free movement of water into the pores of the structure to transport the product from the binder.

The amount of composition present in the device, whether soluble, a derivitized soluble form thereof, is generally non-limited and it is an amount larger than or equal to the amount of the composition that is necessary to osmotically operate the device and on its release from the device is effective for bringing about the product's desired effect. Since the invention contemplates a variety of devices of various sizes and shapes, for a variety of uses, there is no critical upper limit on the amount of product incorporated in the device. The lower limit will depend on osmotic activity, the span of the release of the product and the activity of the product. Generally, the device will contain about 0.01 percent to 90 percent or higher of a product or a mixture of product and solute based on the weight of the product or product solute to the volume of the device, and the like. Typically, the device can be of such size and shape to release 0.01 cc to 5 cc or higher of product contained in the fluid per hour, day or longer, such as 1 cc to 10 cc of product solution for 1 to 10 days, and the like.

The expressions "passageway" and "passageway communicating with" as used herein are comprised of those means and methods suitable for releasing the product from the device under the pumping rate of the device. The expression includes an aperture, orifice, bore, porous silk suture through which product can migrate, hollow cellulose acetate fibers suitable for passing the product, capillary tubes, and thelike. The expression also includes bioerodible materials that erode in the environment of use to produce a passageway. Typical bioerodible materials include erodible polyglycolic and polylactic fibers, erodible gelatinous filaments, polyvinyl alcohol, and the like.

The rate of release of a product from the device can easily be determined by those skilled in the art by standard procedures. In this manner, particular materials used for the device wall and the product or product solute can be selected for manufacturing the device. Generally, the rate of release of a product from the device is easily ascertained by calculating or measuring the amount of product released per unit time expressed as $Q/t$ wherein $Q$ is the quantity of product released in grams in unit time $t$ hours. The thermodynamic driving force for fluid permeation, that is the driving energy for attracting the external fluid into the device, is the difference in free energy of the fluid in the two solutions outside and inside the device, which energy can be related to the difference of the fluid concentration and the osmotic pressure. The solubility of product is defined as the solubility of the product in grams, $g$, per cubic centimeter, cc of fluid or $S$ expressed in $g/cc$. The pumping rate of solution from the device is conveniently expressed by combining $Q/t$ and $S$ to give the equation $R = Q/t \times cc/S/hr$ wherein the solution pumping rate in $cc/hr$, and $Q$, $t$, $cc$ and $S$ are as previously set forth. The permeability of the membrane to an external fluid is described by the known equation P = volume × thickness of membrane/area × time × wherein the thickness of the membrane is expressed in mils, the area in $cm^2$, volume is the permeated volume in cc, and is the osmotic pressure approximated by van't Hoff's Law and expressed in the formulae given as follows: $= C \times i \times R \times T$ wherein $C$ is the concentration of the product in moles per liter, $i$ is the number of ions or particles per molecule of the product, $R$ is the gas constant and $T$ is the absolute temperature in degrees Kelvin.

The size of the passageway in the devices of the invention is designed so that the rate of product delivered, $Q_D/t$, attributed to diffusion in the fluid present in the passageway is always less than the rate of pumping $Q_P/t$ through the passageway. The expression $Q_D$ is the amount of drug expressed in grams diffusing through the passageway in $t$ time, expressed in hours, and $Q_P$ is the amount of product delivered by pumping in the time $t$ in units of grams/hours. The quantity $Q_P/t$ is determined by the amount of fluid which permeates through the membranes as controlled by the permeability of the membrane and its thickness and the osmotic difference across the membrane. In the devices of the invention $Q_P/t$ is greater than $Q_D/t$ which assures that the device is essentially as osmotic powdered device. By combining the above equations, it is immediately obvious that the product rate of release from the device of the invention is encompassed by the following equation: $Q_P/t = k[\text{area of membrane/thickness of membrane} \times \text{osmotic pressure}]$,
wherein $k$ is the permeability coefficient defined as cc of fluid/hr $cm^2 \times$ thickness of membrane/osmotic pressure. The above presentation along with methods for measuring flow rates and the like are described in "Encyl. Polymer Sci. Technol.," Vol. 9, pages 659 to 688, 1968 published by Interscience Publishers; in Encyl. of Chem. Technol.," Vol. 14, pages 345 to 356, 1967, published by Interscience Publishers Inc.; and in "Desalination By Reverse Osmosis," Merten, U., pages 15 to 54, 1966, published by the M.I.T. Press, Cambridge, Mass.

The solubility of a product in a fluid can be determined by various art known techniques. One method consists in preparing a saturated solution, for example, a fluid plus product and ascertaining by analysis the amount of product present in a definite quantity of the fluid. A simple apparatus for this purpose consists of a test tube of medium size fastened upright in a water bath maintained at constant temperature and pressure, for example 37.5°C and one atmosphere. The fluid and product are placed in the tube and stirred by means of a motor driven rotating glass spiral. After a given period of stirring, a definite weight of the fluid is analyzed and the stirring continued for an additional period of time. If the analysis shows no increase after successive periods of stirring, in the presence of excess solid product in the fluid, the solution is saturated and the results are taken as the solubility of the product in the fluid. Numerous other methods are available for the determination of the solubility of a product in a fluid. Typical methods used for the measurement of solubility are chemical analysis, measurement of density, refractive index, electrical conductivity, and the like. Details of various methods for determining solubilities are described in "United States Public Health Service Bulletin," No. 67 of the Hygienic Laboratory; "Encyclopedia of Science and Technology," Vol. 12, pages 542 to 556, 1971, McGraw-Hill, Inc., "Encyclopaedic Dictionary of Physics," Vol. 6, pages 545 to 557, 1962, Pergamon Press Inc.; and the like.

The term "permeation" or "permeation process" as used herein means the transfer or migration of the external fluid through the wall of the device into the product compartment. The permeation process generally depends on the thermodynamic activity gradient for the medium across the wall, and the properties of the rate controlling membrane. These latter properties are reflected in the solubility and the diffusity of the fluid through a homogenous membrane or through a medium in the pores of a heterogenous membrane. See for example "Diffusion in Polymers," by Crank, J. and Park, G. S., Chapter 8, pages 259 to 313, 1968, published by Academic Press, N.Y.

The flux of an external fluid, for example, the rate of water vapor transmission through various wall forming materials is determined by using the procedures in "Diffusion in Polymers," pages 1 to 39 and then expressing the results as WVTR or water vapor transmission rate through a film in grams/100 $in^2/24$ hr/1 mil thick film. Known WVTR values can also be found in "Plastic Film Technology," Park, W. W. R., 1969, published by Van Nostrand-Reinhold Inc., and in "Diffusion in Polymers," pages 274 to 276. Typical values are set forth in Table 1 immediately below wherein film is the material and WVTR is as defined.

TABLE 1

| Film | WVTR |
| --- | --- |
| Polyvinyl alcohol | 100 |
| Polyurethane | 30 – 150 |
| Methylcellulose | 70 |
| Cellulose acetate | 40 – 75 |
| Ethylcellulose | 75 |
| Cellulose acetate butyrate | 50 |
| Polyvinylchloride, cast | 10 – 20 |
| Polyvinylchloride, extruded | 6 – 15 |
| Polycarbonate | 8 |
| Polyvinylfluoride | 3 |
| Ethylene vinylacetate | 1 – 3 |
| Polyesters | 2 |

TABLE 1-Continued

| Film | WVTR |
| --- | --- |
| Cellophane, polyethylene coated | >1.2 |
| Polyvinylidene fluoride | 1.0 |
| Polyethylene | 0.5 – 1.2 |
| Ethylene propylene copolymer | 0.8 |
| Polypropylene | 0.7 |
| Polyvinyl chloride, rigid | 0.7 |

The novel devices of the invention are fabricated by standard techniques. For example, in one embodiment the product, or the product and a binder and/or a solute is mixed or formulated into solid, semi-solid or like form by conventional methods, such as ballmilling, calendering, stirring, shrinking, rollmilling and the like and then charged into the compartment of the device. The wall material forming the device and having the product contained therein can be formed into a given shaped device, in one embodiment, by molding or casting the one wall, pressing a middle wall thereto, charging the compartment, and then sealing a third wall to form the device. A passageway leading through one wall is fabricated by drilling, punching, or depositing a tube in one wall during assembly of the device. The device can also be formed of a continuous wall by pouring, casting or the like, a wall forming material around a removable mold of any desired shape. The devices when formed of more than one wall can be joined by various joining techniques, such as high frequency electronic sealing that provides clean edges and firmly sealed devices. By using, for example, high frequency sealing, the wall forming materials flow melt at the point of contact to suitably join the walls into a composite article of manufacture. The ability to design and shape the wall into an osmotic device of highly reproducible shapes of controllable composition, readily results in the fabrication of osmotic delivery devices with controlled characteristics and thus overcome a significant disadvantage of previously described devices. Other standard manufacturing procedures are described in "Modern Plastics Encyclopedia," Vol. 46, pages 62 to 70, 1969, and these are well known to those skilled in the art and can be used to fabricate the osmotic delivery devices of the invention.

The following examples are merely illustrative of the present invention and they should not be considered as limiting the scope of the invention in any way, as these examples and other equivalents thereof will become apparent to those versed in the art in the light of the present disclosure, drawings, and the accompanying claims.

EXAMPLE 1

An osmotic ocular drug delivery device for the continued release of pilocarpine nitrate at a release rate of 100 $\mu$g/hr from a device with a 1.2 cm$^2$ membrane area and 3 mil membrane thickness, with the pilocarpine nitrate having a solubility of 0.250 g/ml in water and the ocular device designed with an eliptical shape is constructed as follows: first, the predetermined pumping rate of the device for releasing pilocarpine nitrate is calculated from the above presentations as follows 4.10$^{-4}$ ml/hr according to the equation 100 $\mu$g/hr $\times$ 1/0.250 g/ml which requires a corresponding water flux through the membrane 3 mil thick and 1.2 cm$^2$ of 4.10$^{-4}$ ml $\times$ 3 mil/hr $\times$ 1.2 cm$^2$. The flux can be expressed for pilocarpine nitrate through a 1 cm$^2$ area with 1 mil thickness under the osmotic driving force of pilocarpine nitrate as 10$^{-3}$ cc·mil/hr·cm$^2$. The driving force of pilocarpine nitrate for the device is expressed as the osmotic pressure = 25 $\times$ 2 $\times$ 250 g/liter $\times$ 270 g/mole where 2 is the number of ions in a molecule of pilocarpine nitrate and 25 is the product of the gas constant times the absolute temperature of about 300°K. From this experiment was found to be about 50 atmospheres. From an osmotic system comprised of a cellulose acetate wall and the osmotically effective solute potassium sulfate with of 58 atm, the water flux through the cellulose acetate was measured at 10 $\times$ 10$^{-3}$ cc·mil/hr·cm$^2$. The device of this example is constructed with a membrane having a water permeability about 10 times less than cellulose acetate, that is, a semi-permeable wall made of polyurethane with the device's orifice having a length of 1 mm and a diameter of 2 mil to produce the desired constant rate of drug release.

EXAMPLE 2

An osmotic drug delivery device is manufactured according to the procedure of Example 1 wherein the conditions were as described except that in Example 2 the device had an orifice length of 3 mils, an orifice area of 16.5 $\times$ 10$^{-7}$ cm$^2$, an orifice having a radius of 0.73 $\times$ 10$^{-3}$ cm, an orifice of 0.6 mil, a pressure difference across the orifice of 8 $\times$ 10$^{-5}$ atm, and the release rate of 100 $\mu$g/hr.

EXAMPLE 3

An osmotic drug delivery device manufactured with an ellipse shape and comprised of two outer semipermeable walls each fused to an inner middle wall having a center area defining a space and which middle wall extends around and interbonds the internal perimeter of the two outer walls to form an osmotic drug delivery device having a drug compartment for containing a drug and a passageway through positioned between the middle and one of the outer walls is manufactured as follows: first, an essentially uniform wall of a semipermeable material is formed by thoroughly mixing commercially available polyurethane with tetrahydrofuran in a concentration ratio of 25 percent of polyurethane to 75 percent of the solvent and casting the slurry onto a silicone release paper substrate. The solvent is allowed to evaporate at room temperature and the film warm-air dried to yield a drug release rate wall material about 2.5 mils thick. Two walls, each about 16 mm $\times$ 6.75 mm are pressed from the film for use as the semipermeable walls of the device. Next, a middle wall is prepared by mixing ethylene vinylacetate, methylene chloride and Food Drug and Cosmetic blue lake in a percent ratio of 20 to 80 to 0.1 and the ingredients thoroughly mixed in a commercial laboratory v-blender. The slurry is then cast onto a silicone release paper substrate, and the solvent evaporated at room temperature. The film is warm air dried to yield a film 4.2$\pm$ 0.3 mils thick. Next, this film is press cut into an ellipse having the same dimensions of the just press cut polyurethane walls. The middle wall is press cut with the center area punched out to yield a continuous ellipse defining an opening. Then, onto one of the semipermeable walls is placed the middle wall and these two walls placed into a conventional standard vacuum laminator. Next, a vacuum is pulled to 29 inches of mercury and held for 3 minutes. At the end of 3 minutes, a high flux radiant heater is positioned over the walls and heated for about 15 seconds or until the temperature reaches 90°C. At the end of the heating, a pressure head is applied to the two walls and a pressure of 15 lb. applied for 45 seconds to firmly seal the two walls, and the vacuum released.

Next, a drug core compressed of water soluble pilocarpine nitrate dispersed in ethylene vinylacetate is placed into the compartment, and a passageway formed by laying a porous silk suture over the middle ring and the third wall placed in contact with the middle wall. The three walls are then subjected to a vacuum, and heat laminated as just described to produce a composite article of manufacture. The osmotic drug delivery device when placed into an adult human eye will administer 30 μg/hr of pilocarpine.

EXAMPLE 4

As osmotic drug delivery device for the prolonged, continuous and controlled rate of drug administration is manufactured according to the procedure of Example 3 with the device comprised of two outer walls each having an annular ring bonded thereto and a hollow fiber positioned between the two outer walls. The hollow fiber connects the exterior of the device with the interior compartments containing pilocarpine nitrate. The two walls with their annular rings are sealed at the annular ring interface as in Example 3.

The novel, osmotic product delivery device of this invention employs a unique means which facilitates the obtainment of precisely conducted product release rates in the environment of use. While there has been desribed and pointed out the fundamental novel features of the invention as applied to the presently preferred embodiments, those skilled in the art will appreciate that various modifications, changes and omissions in the osmotic product delivery devices illustrated and described can be made without departing from the spirit of the invention.

What is claimed is:

1. An osmotic device for the continuous dispensing of an active agent, said device comprising:
   a. a shaped wall formed of a substantially imperforate, semipermeable material that maintains its integrity during the dispensing period and which is characterized by being permeable to the passage of an external fluid in the environment of use and essentially impermeable to the passage of agent with the wall surrounding and forming;
   b. a compartment containing an active agent that is soluble in the external fluid, and which agent exhibits an osmotic pressure gradient across the wall against the external fluid to internally pressurize the compartment in the environment of use;
   c. an osmotic passageway positioned in the imperforate wall and extending therethrough with the passageway communicating with the compartment and the exterior of the device, said passageway designed and sized for osmotically pumping the agent through the passageway from the device; and
   d. wherein in operation with the device in the environment of use, the external fluid from such environment is continuously imbibed through the wall into the compartment in tendency towards osmotic equilibrium at a rate determined by the permeability of the wall and the osmotic pressure gradient across the wall thereby continuously dissolving the agent which in turn is then pumped under pressure from the device through the passageway at a controlled rate over a prolonged period of time.

2. An osmotic device for the continuous release of the agent according to claim 1 wherein the agent is a drug.

3. An osmotic device for the continuous release of the agent according to claim 2 wherein the agent is contained in the compartment along with an osmotically effective solute which in solution exhibits an osmotic pressure gradient against the external fluid.

4. An osmotic device for the continuous release of the agent according to claim 1 wherein the device is adapted for the release of the agent in the vagina.

5. An osmotic device for the continuous release of the agent according to claim 1 wherein the device is an oral device adapted for the release of the agent in the gastrointestinal tract.

6. An osmotic device for the continuous release of the agent according to claim 1 wherein the device is adapted for the release of the agent subcutaneously.

7. An osmotic device for the continuous release of the agent according to claim 1 wherein the device is adapted for the release of the agent in the uterus.

8. An osmotic device for the continuous release of the agent according to claim 1 wherein the wall of the device is comprised of an imperforate erodible material that is permeable to the passage of an external fluid and essentially impermeable to the passage of the agent, and wherein the material erodes in the environment of use after the dispensing period.

9. An osmotic device for the continuous dispensing of the agent according to claim 1 wherein the wall of the device is essentially insoluble in the external fluid.

10. An osmotic device for the continuous dispensing of the agent according to claim 1 wherein the device is shaped and adapted for the release of the agent in the mouth.

11. An osmotic ocular drug delivery device for the continuous and prolonged administration of an ophthalmic drug comprising:
   a. an ophthalmic drug that exhibits an osmotic pressure gradient against eye fluid;
   b. a shaped wall formed of a substantially imperforate, semipermeable material that maintains its integrity during the dispensing period and which is characterized by being permeable to the passage of eye fluid in the environment of use and essentially impermeable to the passage of ophthalmic drug, with the wall surrounding and forming;
   c. a compartment containing the ophthalmic drug that exhibits an osmotic pressure gradient across the wall against the eye fluid to internally pressurize the compartment in the environment of use;
   d. an osmotic passageway positioned in the imperforate wall and extending therethrough with the passageway communicating with the compartment and the exterior of the device said passageway designed and sized for osmotically pumping the drug through the passageway from the device; and
   e. wherein in the environment of use eye fluid is continuously imbibed through the wall into the compartment in tendency towards osmotic equilibrium at a rate proportional to the permeability of the wall and the osmotic pressure gradient across the wall thereby continuously dissolving the agent which in turn is then pumped under pressure from the device through the passageway at a controlled rate over a prolonged period of time from the device.

12. An osmotic device for the continuous dispensing of a beneficial agent, said device comprising;
   a. a shaped wall formed of a material that maintains its integrity during the dispensing period, said wall comprised of an imperforate, semipermeable material that is permeable to the passage of an external fluid in the enivironment of use and substantially impermeable to the passage of the agent, with the wall surrounding and forming;
   b. a compartment containing a mixture of an agent that has limited solubility in the fluid and an osmotically effective solute composition soluble in the fluid which exhibits an osmotic pressure gradient across the wall against the external fluid to internally pressurize the compartment in the environment of use;
   c. an osmotic passageway positioned in the imperforate wall and extending therethrough with a passageway communicating with the compartment to the exterior of the device, said passageway designed and sized for osmotically pumping the agent through the passageway from the device; and
   d. wherein in operation with the device in the environment of use, external fluid from such environment is continuously imbibed through the wall into the compartment in tendency towards osmotic equilibrium at a rate controlled by the permeability of the wall and the osmotic gradient across the wall thereby continuously dissolving the solute composition, which as a mixture with the agent is then in turn pumped from the device through the passageway at a controlled rate for a prolonged period of time.

13. A dispensing device for the continuous release of a product according to claim 12 wherein the agent is a drug.

14. An osmotic dispensing device for the continuous release of a beneficial agent according to claim 12 wherein the wall is formed in part of an imperforate material permeable to the passage of the fluid and impermeable to the passage of the agent and the remainder of the wall is formed of an imperforate material impermeable to the passage of both the fluid and the agent.

15. An osmotic device for the continuous dispensing of an active agent, said device comprising;
   a. a shaped wall formed of a substantially pore-free semipermeable material which is characterized by being permeable to the passage of an external fluid in the environment of use and essentially impermeable to the passage of agent with the wall surrounding and forming;
   b. a compartment containing means for producing pressure therein, said means being an active agent that is soluble in the external fluid, and which agent exhibits an osmotic pressure gradient across the wall against the external fluid to internally pressurize the compartment in the environment of use;
   c. an osmotic passageway positioned in the wall and extending therethrough with the passageway communicating with the compartment and the exterior of the device, said passageway including means for maintaining said pressure in the compartment during the dispensing period; and
   d. wherein in operation with the device in the environment of use, the external fluid from such environment is continuously imbibed through the wall into the compartment, in tendency towards osmotic equilibrium at a rate determined by the permeability of the wall and the osmotic pressure gradient across the wall, thereby continuously dissolving the agent which in turn is then pumped under pressure from the device through the passageway at a controlled rate over a prolonged period of time.

* * * * *